I. H. DOAN & J. GALLOWAY.
Ditching-Machine.

No. 222,876.  Patented Dec. 23, 1879.

Witnesses.
A. Ruppert,
James H. Lange.

Isaac H. Doan,
Joseph Galloway,
Inventor.
per Elam Brothers
Attorneys.

UNITED STATES PATENT OFFICE.

ISAAC H. DOAN AND JOSEPH GALLOWAY, OF WELLINGTON, ILLINOIS.

IMPROVEMENT IN DITCHING-MACHINES.

Specification forming part of Letters Patent No. 222,876, dated December 23, 1879; application filed February 14, 1879.

*To all whom it may concern:*

Be it known that we, ISAAC H. DOAN and JOSEPH GALLOWAY, of Wellington, in the county of Iroquois and State of Illinois, have invented certain new and useful Improvements in Ditching-Machines; and we do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
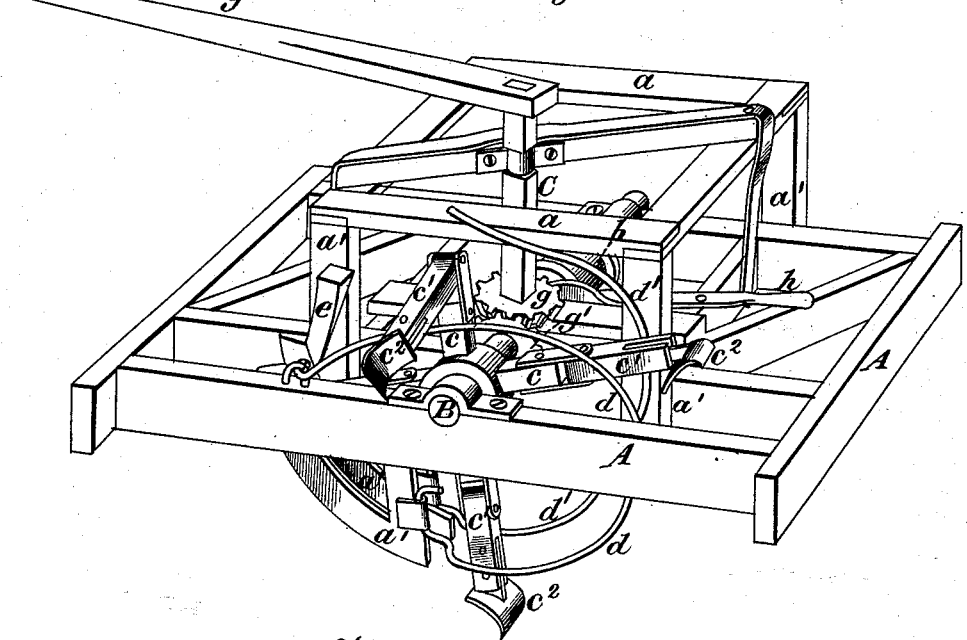
Figure 2:
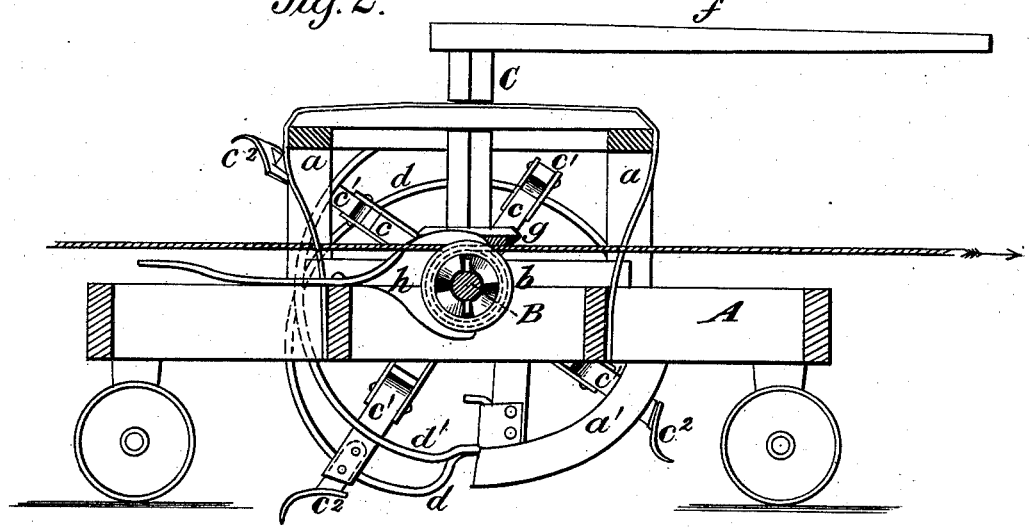

Figure 1 is a perspective view of our improved ditching-machine, and Fig. 2 is a vertical transverse section of the same.

The same part in the two figures is denoted by the same letters.

This invention relates to certain improvements in ditching-machines, particularly adapted for forming excavations or ditches for tile, &c.; and it consists in the employment of a series of radial arms or spokes, hinged or pivoted to swing laterally, and provided with shovels or excavating implements, in connection with a spoked shaft and guiding and holding mechanism for the shovels, substantially as hereinafter more fully set forth.

In the accompanying drawings, A refers to a frame or like support supporting a shaft, B, carrying a drum or windlass, $b$. Around this drum is once coiled a rope, stretched across the field and fastened, preferably, to stakes driven in the ground. This secures the movement of the machine across the field to be ditched as the shaft is revolved, in the manner presently set forth. Upon this shaft, at one end, is preferably secured or formed a hub or enlargement provided with a series of radial spokes, $c\ c$. To these spokes are hinged or pivoted arms or spokes $c'\ c'$, provided with shovels or excavating implements $c^2\ c^2$, curved so as to hold the excavated earth while being elevated. These arms $c'\ c'$ are hinged so as to swing laterally when unsupported, to enable the emptying of the shovels to one side of the path of the machine, or so as to not allow the excavated earth elevated by the shovel to fall back into the ditch or excavation.

$d\ d'$ are guide and holding rails curved nearly into circles and fastened to the upper side of the frame A and a superimposed frame, $a$, and at their lower ends to the rear ends of the side pieces of the opener or leg $a'$, fastened to the under side of the frame A. These metallic rails are arranged so that when the hinged shovel-arms have descended to cause their shovels to strike and enter the ground the said arms will be prevented from being turned to one side, and that when they have been elevated with their contents they will be allowed to empty the said contents or earth over the side of the machine. The said shovel-arms in their ascent strike a cam or projection, $e$, affixed to the superimposed frame $a$, which causes the tilting of the said arms and the emptying of their shovels, as above stated.

C is an upright shaft, supported in a bearing strapped or fastened to a beam of the frame $a$, and provided with a sweep, $f$, to which the horse or team or other motor is applied for operating the machine. To the lower end of this shaft is attached a beveled pinion, $g$, meshing with a corresponding pinion, $g'$, upon the shaft B, carrying the driving-drum and excavating implements or shovels. This drum $b$ is controlled by a shipper, $h$, manipulated by hand.

From the foregoing it will be observed that as the sweep $f$ is carried around by the team or otherwise the excavating-shovels will be operated so as to produce the required width of ditch, while at the same time the machine will be moved in the direction across the field it is desired to extend the ditch or excavation.

Having thus fully described our invention, we claim and desire to secure by Letters Patent—

1. In a ditching-machine, the combination, with a spoked shaft, of an arm or arms hinged or pivoted to swing laterally to deliver the earth, having excavating implements, substantially as and for the purpose set forth.

2. In a ditching-machine, the combination, with a spoked shaft having hinged shovel-arms, hinged or pivoted to swing laterally to deliver the earth, of guide and holding rails, substantially as and for the purpose specified.

3. The combination, in a ditching-machine, with the spoked shaft having laterally-swinging arms provided with shovels or excavating implements, of the geared upright shaft carrying a sweep, substantially as and for the purpose set forth.

4. The combination of the frame A, spoked shaft B, having hinged or pivoted excavating or shovel arms $c'\,c'$, rails $d\,d'$, drum $b$, geared upright shaft C, and sweep $f$, substantially as and for the purpose set forth.

5. In a ditching-machine, the combination, with the spoked shaft having an arm or arms hinged or pivoted to swing laterally to deliver the earth, of the cam or projection for tilting the same, substantially as and for the purpose set forth.

6. In a ditching-machine, the combination, with the spoked shaft having the hinged laterally-swinging arms, of the guiding and supporting-rails $d\,d'$, substantially as and for the purpose set forth.

In testimony that we claim the foregoing as our own we affix our signatures in presence of two witnesses.

ISAAC H. DOAN.
JOSEPH GALLOWAY.

Witnesses:
C. L. MEAD,
A. J. HALL.